(12) United States Patent
Takeda

(10) Patent No.: US 6,383,650 B1
(45) Date of Patent: May 7, 2002

(54) NON-ORIENTED ELECTROMAGNETIC STEEL SHEET HAVING INSULATING FILM EXCELLENT IN FILM PROPERTIES

(75) Inventor: Kazutoshi Takeda, Himeji (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/603,289

(22) Filed: Jun. 23, 2000

Related U.S. Application Data

(62) Division of application No. 09/197,931, filed on Nov. 23, 1998, now Pat. No. 6,159,534.

(51) Int. Cl.⁷ .................................................. B32B 15/04
(52) U.S. Cl. ........................ 428/469; 428/457; 428/704
(58) Field of Search ................................ 428/469, 457, 428/704, 472.3

(56) References Cited

U.S. PATENT DOCUMENTS

| | | | |
|---|---|---|---|
| 4,554,213 A | | 11/1985 | Marini et al. |
| 4,618,377 A | | 10/1986 | Nakamura et al. |
| 5,955,201 A | * | 9/1999 | Loudermilk et al. ........ 428/450 |

FOREIGN PATENT DOCUMENTS

| | | |
|---|---|---|
| EP | 06 25 582 | 11/1994 |
| EP | 06 76 486 | 10/1995 |
| EP | 07 00 059 | 3/1996 |
| JP | 57-194210 | 11/1982 |

* cited by examiner

*Primary Examiner*—Deborah Jones
*Assistant Examiner*—Gwendolyn Blackwell-Rudasill
(74) *Attorney, Agent, or Firm*—Kenyon & Kenyon

(57) ABSTRACT

The present invention provides a film-forming agent for an insulating film-coated non-oriented electromagnetic steel sheet showing a high space factor, and excellent in blanking quality, adhesion of the film and slip characteristics subsequent to stress relief annealing, a non-oriented electromagnetic steel sheet having the insulating film and a method for producing the same. The present invention provides a non-oriented electromagnetic steel sheet having an insulating film excellent in film properties, the insulating film comprising a metal phosphate and an organic resin as the principal components, the 1s peak intensity of C being from 4 to 20 times as much as the 2s peak intensity of P when the insulating film is measured by photoelectron spectral analysis.

1 Claim, No Drawings

NON-ORIENTED ELECTROMAGNETIC STEEL SHEET HAVING INSULATING FILM EXCELLENT IN FILM PROPERTIES

This application is a divisional application under 37 C.F.R. §1.53(b) of prior application Ser. No. 09/197,931 filed Nov. 23, 1998 now U.S. Pat. No. 6,159,534. The disclosures of the specification, claims, and abstract of application Ser. No. 09/197,931 are incorporated herein by reference.

BACKGROUND OF THE INVENTION

1. Field of the Invention

The present invention relates to an insulating film-forming agent for a non-oriented electromagnetic steel sheet having a high space factor, which exhibits an excellent adhesion of the insulating film and an excellent blanking quality, and which is excellent in slip characteristics after stress relief annealing, adhesion of the insulating film and corrosion resistance, and a method for producing a non-oriented electromagnetic steel sheet by coating the steel sheet substrate with the insulating film-forming agent.

2. Description of the Prior Art

When a laminated iron core for a motor, a transformer, etc. is produced with a non-oriented electromagnetic steel sheet, unit iron cores are usually prepared from the non-oriented electromagnetic steel sheet by shearing or blanking the sheet, stacked, and the stacked unit iron cores are fixed by bolting, caulking, welding, bonding, or the like procedure. The laminated iron core thus obtained is subjected to winding coil incorporation, or the like treatment, and finally a motor or transformer is assembled.

An insulating film is generally formed on a non-oriented electromagnetic steel sheet. Since the various properties of the steel sheet such as weldability, blanking quality and corrosion resistance greatly depend on the insulating film properties, it is important to impart not only insulating properties but also excellent film properties to the insulating film.

An inorganic, an organic, and an inorganic-organic mixture type insulating film have heretofore been known as the insulating film of a non-oriented electromagnetic steel sheet. However, the steel sheet having an inorganic insulating film exhibits a poor blanking quality compared with that having an organic insulating film or inorganic-organic mixture type insulating film. The steel sheet having an organic insulating film exhibits a poor adhesion of the film after stress relief annealing and a poor corrosion resistance compared with the steel sheet having an inorganic insulating film or inorganic-organic mixture type insulating film. Accordingly, the inorganic insulating film and the inorganic-organic mixture type insulating film cannot be used.

The inorganic-organic mixture type insulating films have been intensively investigated to solve the problems of the inorganic and the organic insulating films. Japanese Examined Patent (Kokoku) Publication No. 50-15013 proposes a method for forming an insulating film on a non-oriented electromagnetic steel sheet so that the resultant steel sheet exhibits film properties such as a high space factor, an excellent adhesion of the film and an excellent blanking quality, which method comprises forming an insulating film with a treatment solution containing a dichromate and an organic resin emulsion of a resin such as a vinyl acetate resin, a butadiene-styrene copolymer or acrylic resin as the principal components.

However, a Cr compound is used as a film component in the inorganic-organic mixture type insulating film of a conventional non-oriented electromagnetic steel sheet as observed in the use of a dichromate. Consequently, in the present situation where the production process of non-oriented electromagnetic steel sheets or customers of such non-oriented electromagnetic steel sheets are confronted with severe environmental problems, development of a technology for treating an insulating film containing no chromium compound is desired.

Japanese Unexamined Patent (Kokai) Publication No. 6-330338, therefore, discloses the following treatment method: a treatment method comprising mixing a phosphoric acid salt having a specific composition and an organic resin emulsion having a specific particle size in a specific proportion, coating a steel sheet with the resultant treatment solution, and baking finishing the steel sheet. The method uses a treatment solution containing no chromium compound, and the steel sheet obtained by the method shows film properties comparable to those of a conventional insulating film containing a chromium compound, and maintains excellent slip characteristics after stress relief annealing.

However, the technology disclosed in Japanese Unexamined Patent (Kokai) Publication No. 6-330338 has been found to have the following problem. The organic resin emulsion often agglomerates in the treatment solution or during the coating and baking step. As a result, portions containing no organic resin mingle with portions containing the organic resin in the insulating film, resulting in lowering the blanking quality of the steel sheet.

When an insulating film is to be formed on a non-oriented electromagnetic steel sheet, the steel sheet is usually coated with an insulating film treatment solution and baking finished subsequently to continuous annealing. It is, therefore, industrially important that the insulating film excellent in film properties can be stably formed over a long period of time without agglomerating the organic resin.

Furthermore, since many motors and transformers have complicated shapes, blanking conditions such as a clearance partially deviates from the optimum value sometimes. It has been found that the blanking quality lowers in such a case when the technology disclosed in Japanese Unexamined Patent (Kokai) Publication No. 6-330338 is employed.

SUMMARY OF THE INVENTION

As a result of intensively investigating the problems, the present inventors have discovered that the best method for making a non-oriented electromagnetic steel sheet having an insulating film containing a phosphoric acid salt and an organic resin as the principal components have an excellent blanking quality even when the blanking conditions such as a complicated blanking shape are not good is to improve the blanking quality by dispersing an organic compound in the inorganic component of the phosphoric acid salt in addition to the organic resin conventionally having been added to the film composition, so that the organic carbon content contained in the insulating film surface is increased.

The present invention is based on the discoveries as mentioned above, and the gist of the present invention is as described below.

A first object of the present invention is to provide a non-oriented electromagnetic steel sheet having an insulating film excellent in film properties, the insulating film comprising a metal phosphate and an organic resin as the principal components, the is peak intensity of C (carbon) being from 4 to 20 times as much as the 2s peak intensity of P (phosphate) when the insulating film is measured by photoelectron spectral analysis.

A second object of the present invention is to provide a method for producing a non-oriented electromagnetic steel sheet having an insulating film excellent in film properties, comprising coating a non-oriented electromagnetic steel sheet substrate with an insulating film-forming agent which is a treatment solution containing a metal phosphate and an organic resin as the principal components, and further comprising from 5 to 50 parts by weight of a water-soluble organic compound having a boiling point or sublimation point of at least 100° C., based on 100 parts by weight of the metal phosphate, and baking the coated steel sheet at 200 to 400° C.

A third object of the present invention is to provide an insulating film-forming agent used for the production of a non-oriented magnetic steel sheet having an insulating film excellent in film properties, which agent is a treatment solution containing a metal phosphate and an organic resin as the principal components, and further comprising from 5 to 50 parts by weight of a water-soluble organic compound having a boiling point or sublimation point of at least 100 ° C., based on 100 parts by weight of the metal phosphate.

DESCRIPTION OF THE PREFERRED EMBODIMENTS

The present invention will be explained below in detail.

It has been well known that the blanking quality of a non-oriented electromagnetic steel sheet is greatly influenced by the composition of the insulating film. A non-oriented electromagnetic steel sheet having an organic insulating film shows a good blanking quality, and a non-oriented electromagnetic steel sheet having an organic-inorganic mixture type insulating film in which a chromate and an organic resin are mixed also shows a good blanking quality. It has, therefore, been estimated that the blanking quality of a non-oriented electromagnetic steel sheet is improved by the lubricating action of an organic resin. However, a non-oriented electromagnetic steel sheet having an insulating film which has a composition of a mixture of a phosphoric acid salt and an organic resin shows a blanking quality which is not improved to the same extent as the blanking quality of a non-oriented magnetic steel sheet having an insulating film which has a composition of a mixture of a chromate and an organic resin.

On the other hand, the C content on the surface of an insulating film containing a phosphoric acid salt and an organic resin as the principal components can be measured by photoelectron spectral analysis. The present inventors have discovered that the blanking quality of the non-oriented electromagnetic steel sheet is improved when the 1s peak intensity of C is from 4 to 20 times as much as the 2s peak intensity of P as measured by the analysis. Moreover, the present inventors have discovered that the ratio of the 1s peak intensity of C to the 2s peak intensity of P can be increased by the use of an insulating film-forming agent which is a mixture of a treatment solution containing a phosphoric acid salt and an organic resin as the principal components and a water-soluble organic compound, and that the blanking quality of the non-oriented electromagnetic steel sheet is significantly improved.

Although the detail of the function of the water-soluble organic compound has not been clarified, it is estimated that the compound increases the stability of organic resin molecules in the treatment solution, and remains in the film after baking to strengthen the lubricating action of the film.

The inorganic compounds used in the present invention will be explained. Examples of the metal phosphate used in the present invention include Al phosphate, Ca phosphate, Zn phosphate and Mg phosphate. The metal phosphates function as binders. A metal phosphate usually is a reaction product of a metal oxide and phosphoric acid. The properties of the film thus formed vary in accordance with the molecular ratio of the metal oxide to the phosphoric acid. When Al is used as the metal in the present invention, an $Al_2O_3/H_3PO_4$ molecular ratio of 0.13 to 0.20 is employed. When the molecular ratio is less than 0.13, free phosphoric acid increases, and the hygroscopicity of the insulating film unpreferably increases. On the other hand, when the molecular ratio exceeds 0.20, the stability of Al phosphate itself is lowered, and Al phosphate is unpreferably precipitated in the solution. Similarly, the metal oxide/phosphoric acid molecular ratio is restricted to 0.40 to 0.60 when Ca phosphate, Zn phosphate or Mg phosphate is used.

In the present invention, one or two substances selected from colloidal silica, boric acid and boric acid salts are used if necessary. When such substances are added, the film is improved, for example, the film is densified, the surface gloss of the film is increased, or the like.

Next, organic resins used in the present invention are explained below. Examples of the organic resin used in the present invention include acrylic resin, polystyrene, vinyl acetate resin, epoxy resin, polyurethane, polyamide, phenolic resin, melamine, silicone, polypropylene and polyethylene. One or at least two of such resins can be used in the present invention. There is no specific limitation on the particle size of the organic resin emulsion. However, a particle size of up to 1.0 $\mu$m is preferred when the stability of the treatment solution is considered.

The preferred mixing proportion of the organic resin to the phosphoric acid salt is from 5 to 300 parts by weight of the organic resin component to 100 parts by weight of the phosphoric acid salt. When the organic resin component is less than 5 parts by weight, the film becomes white, and loses its gloss. When the organic resin component exceeds 300 parts by weight, the film may be peeled off after stress relief annealing.

The water-soluble organic compound used in the present invention is a water-soluble organic substance such as alcohol, ester, ketone, ether, carboxylic acid or sugar, and it is soluble in a solution of an inorganic substance such as a phosphoric acid salt. When a non-oriented electromagnetic steel sheet is coated with a mixture obtained by mixing a treatment solution containing a phosphoric acid salt and an organic resin with the water-soluble organic compound, and dried, the water soluble organic compound is contained in the inorganic component such as a phosphoric acid salt. Moreover, the water-soluble organic compound in the present invention naturally designates an organic compound which is infinitely soluble in water, but an organic compound having a relatively high solubility in water is also satisfactory as the compound therein. Concrete examples of the water-soluble organic compound which can be used include alcohols such as butanol and propanol, polyols such as propylene glycol, glycerin, ethylene glycol and triethylene glycol, ketones such as methyl ethyl ketone and diethyl ketone, carboxylic acids such as acetic acid and propionic acid, substances having a metal carboxylate structure such as sodium maleate, saccharides such as sucrose, cellosolves such as methyl cellosolve and butyl cellosolve, Carbitols such as diethylene glycol monomethyl ether and diethylene glycol diethyl ether, ethers such as tetraethylene glycol dimethyl ether and 1,4-dioxane, esters such as ethylene glycol monomethyl ether acetate, and sorbitol or pyrogallol.

Since the water-soluble organic compound used in the present invention must remain in the film after coating and baking, the boiling point of the water-soluble organic compound which is liquid or the sublimation point of the compound which is solid must be higher than the boiling point of water which is 100° C. Usually, the boiling point or sublimation point is desirably at least 200° C.

The mixing amount of the water-soluble organic compound is restricted to 5 to 50 parts by weight based on 100 parts by weight of the phosphoric acid salt for reasons as described below. When the amount is less than 5 parts by weight, the effects of the water-soluble organic compound cannot be obtained; when the amount is at least 50 parts by weight, the film becomes turbid in white, and a film surface having a gloss cannot be obtained.

In the present invention, the is peak intensity of C is defined to be from 4 to 20 times as much as the 2s peak intensity of P as measured by photoelectron spectral analysis for reasons as explained below. That is, when a film shows a 1s peak intensity of C which is less than 4 times the 2s peak intensity of P, a sufficient blanking quality of the non-oriented electromagnetic steel sheet cannot be ensured; when the film shows a 1s peak intensity of C which is greater than 20 times the 2s peak intensity of P, the film shows a poor gloss. The photoelectron spectral analysis is employed herein because the element contents present on the surface of the insulating film can be measured thereby.

EXAMPLES

A coil having a thickness of 0.5 mm of a non-oriented magnetic steel sheet subsequent to finish annealing which was treated by the conventional process was coated with a treatment solution as shown in Table 1 with a rubber roll coating apparatus, and baking finished at 300° C. (sheet temperature) to have a coating amount of 1.2 g/m$^2$. Samples were cut out of the coil, and part of the samples were subjected to stress relief annealing in a nitrogen stream at 750° C. for 2 hours. The film properties were then evaluated, and the results thus obtained are shown in Table 2.

TABLE 1

| Treatment solution | Inorganic component (wt. parts) | Organic resin component (wt. parts) | Water-soluble organic substance |
|---|---|---|---|
| Example 1 | Al phosphate (100) | styrene-acrylic (50) | glycerin (10) |
| Example 2 | Al phosphate (100) | styrene-acrylic (30) | sorbitol (6) |
| Example 3 | Al phosphate (100) | acrylic-epoxy (25) | glycerin (40) |
| Example 4 | Mg phosphate (100) | acrylic-phenol (30) | ethylene glycol (20) |
| Example 5 | Al phosphate (100) | acrylic-epoxy (75) | 1,4-dioxane (15) |
| Example 6 | Mg phosphate (100) | acrylic-vinyl acetate (30) | butyl cellosolve (20) |
| Example 7 | Mg phosphate (100) | acrylic-phenol (30) | diethylene glycol monomethyl ether (40) |
| Comp. Ex. 1 | Al phosphate (100) | styrene-acrylic (30) | ethylene glycol (1) |
| Comp. Ex. 2 | Al phosphate (100) | epoxy (30) | ethylene glycol (80) |
| Comp. Ex. 3 | Mg phosphate (100) | styrene-acrylic (30) | ethyl alcohol (10) |
| Conv. Ex. 1 | Al phosphate (100) | styrene (30) | not added |

TABLE 1-continued

| Treatment solution | Inorganic component (wt. parts) | Organic resin component (wt. parts) | Water-soluble organic substance |
|---|---|---|---|
| Conv. Ex. 2* | Mg chromate (100) boric acid (20) | acrylic-styrene-vinyl acetate (20) | ethylene glycol (2) |

Note:
*Conventional Example 2 is an instance of a general insulating film of a magnetic steel sheet which film contained Mg chromate as the principal component

TABLE 2

| Treatment solution | Peak intensity ratio in photoelectron spectral analysis | Space factor (%) | Adhesion *a | Slip characteristics *b (%) | Blanking quality *C (×10$^4$ times) |
|---|---|---|---|---|---|
| Example 1 | 5.16 | 99.6 | ⊕ | 100 | >100 |
| Example 2 | 6.57 | 99.5 | ⊕ | 100 | >100 |
| Example 3 | 7.59 | 99.6 | ⊕ | 100 | >100 |
| Example 4 | 7.20 | 99.7 | ⊕ | 100 | >100 |
| Example 5 | 8.80 | 99.6 | ⊕ | 100 | >100 |
| Example 6 | 11.00 | 99.5 | ⊕ | 100 | >100 |
| Example 7 | 6.19 | 99.6 | ⊕ | 100 | >100 |
| Comp. Ex. 1 | 2.13 | 99.6 | ⊕ | 100 | 12 |
| Comp. Ex. 2 | 21.63 | 99.5 | Δ | 100 | 100 |
| Comp. Ex. 3 | 2.95 | 99.4 | ⊕ | 100 | 45 |
| Conv. Ex. 1 | 1.30 | 99.4 | ⊕ | 100 | 8 |
| Conv. Ex. 2 | —** | 99.6 | ⊕ | 20 | >100 |

Note:
*a peeling resistance evaluated with an adhesive cellophane tape
⊕ no adhesion,
o adhesion to some extent,
Δ much adhesion,
x peeling
*b acceptance ratio in the slip test
*c number of blanking counted until the burr height becomes 6 μm with an E I core type steel die 66 mm wide being used
**Conventional chromic acid-containing film contains no phosphorus.

In addition, in the measurement by photoelectron spectral analysis, the 2s peak of P near 189 eV and the 1s peak of C near 285 eV were measured using ESCA-K1 (trade name, manufactured by Shimazu Corporation). The samples to be measured were washed with distilled water and acetone, and measured.

Furthermore, a commercially available surface lubricity test apparatus was used for measuring the slip characteristics. The measurements were made under a load of 100 gf using a steel ball 10 mm in diameter which was moved at a rate of 20 mm/sec. When 10 round trip frictions were made, the slip characteristics were evaluated as follows: samples on which defects and peeling were not formed were accepted; samples on which defects were formed or the ball was caught were rejected.

It is understood from Table 2 that a non-oriented electromagnetic steel sheet having an insulating film formed in the examples showed a high space factor, an excellent blanking quality, an excellent adhesion of the film and excellent slip characteristics.

According to the present invention, a non-oriented electromagnetic steel sheet can be obtained which has an insulating film formed with an insulating film treatment agent containing no chromium compound, and which shows a high space factor, an excellent blanking quality, an excellent adhesion of the film and excellent slip characteristics.

What is claimed is:

1. A non-oriented electromagnetic steel sheet having an insulating film excellent in film properties, the insulating film comprising a metal phosphate and an organic resin as the principal components, the 1s peak intensity of C being from 4 to 20 times as much as the 2s peak intensity of P when the insulating film is measured by photoelectron spectral analysis.

* * * * *